UNITED STATES PATENT OFFICE.

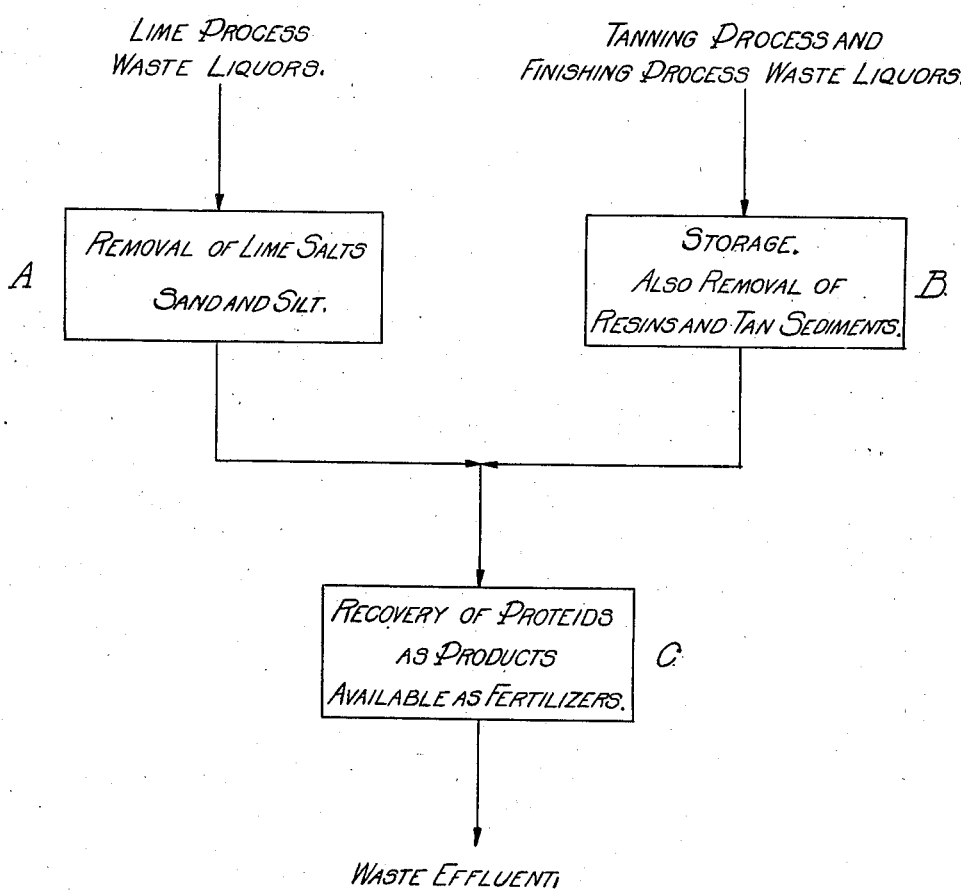

CHARLES LEE PECK, OF NEW YORK, N. Y., ASSIGNOR TO THE DORR COMPANY, OF NEW YORK, N. Y., A CORPORATION OF DELAWARE.

RECOVERY OF PROTEIDS FROM WASTE LIQUORS OF THE HIDE-TREATING ART.

1,274,763.  Specification of Letters Patent.  Patented Aug. 6, 1918.

Application filed March 2, 1918. Serial No. 219,981.

*To all whom it may concern:*

Be it known that I, CHARLES LEE PECK, a citizen of the United States, residing at New York city, in the county of New York, State of New York, have invented certain new and useful Improvements in Recovery of Proteids from Waste Liquors of the Hide-Treating Art; and I do hereby declare the following to be a full, clear, and exact description of the invention, such as will enable others skilled in the art to which it appertains to make and use the same.

The present invention relates to the recovery, in a form available for use in the fertilizer industry, in the manufacture of ammonia, and for other useful purposes, of the proteids present in the waste liquors from the lime process of the treatment of hides, and by the use of the waste liquors from the tanning process *per se* and, if desired, by the contributory action of other acid waste liquors as, for instance, the waste liquors from the finishing process to which the tanned hide is subjected.

By the use of the invention, these proteid substances from the lime process, which are mainly in solution in the waste liquors from that process, but which are, in part, in suspension therein, are recovered, in their substantial entirety, in a condition which renders them non-putrefiable, and which ultimately permits their nitrogen content to be made available, as stated, for use as fertilizer, or in the production of ammonia, or for any other useful purpose. The invention has the further advantage that the effluent or final waste liquor left after the precipitation of the recovered proteids contains no hydrated alkali, and no free acid (except a certain quantity of $CO_2$ held in solution therein), so that said final effluent is not a meance to public health, or to fish life and can be discharged, without disadvantage, into running streams. It is a further merit of the invention that in the application of the ultimate fertilizer to the soil, it is devoid of all noxious bacteria which, in any way, could have been present in the original hides from which the waste liquors were derived, so that the application of the fertilizer to the soil is wholly beneficent.

In the treatment of hides, preparatory to the tanning thereof, the raw hides are first subjected to a cleansing process, having for its object to swell them somewhat and to deprive them, for the most part, of adhering foreign substances, the cleansing being due to the washing and solvent power of water, assisted to a greater or less extent, by agitation, beating, rubbing, or the like. The hides, which, in the usual practice, have been salted, are then subjected to the so-called lime process, well known in the art, wherein they are subjected to the action of caustic lime, sodium sulfid, sodium hydrate, and the like for the removal of greasy particles, fleshings and hair.

In accordance with the present invention, the waste liquor from this lime process is received in a receiving tank or cistern, wherein there is effected a separation of the undissolved lime salts, sand, and silt, in any suitable way, as, for instance, by sedimentation. The supernatant waste liquor or effluent from this tank or cistern has in solution (and partly in suspension) the proteids which it is the main purpose of the invention to recover. For this purpose, the said supernatant liquor or effluent is conveyed into another tank or cistern, wherein the recovery of the proteids is effected.

The agent employed for the recovery of the proteids is the acid waste liquors from the tanning processes such as vegetable tanning, chrome tanning, and the like. In order to remove, for the most part at least, inert sediments, etc., and for the further purpose of storing the waste tan liquors for convenience in the use of the process, the liquors are received in a suitable tank or cistern, wherein the resins, tan sediments, and other like inert materials are permitted to settle out, by sedimentation, or to be otherwise separated. The effluent from this sedimentation tank or cistern is then available for use in the recovery of the proteids in solution or in suspension, hereinbefore referred to.

In the majority of plants or establishments engaged in the tanning of hides, the quantity of liquor employed for cleansing the green hides and for subjecting them to the lime process is from ten to twenty times the volume of the waste liquors from the tanning process, the general average relation between the volumes of these liquors being say as 15 to 1. Accordingly, it is convenient and desirable to provide, as hereinbefore specified, a tank or cistern for the reception of the waste tan liquors, which has the two-fold function of permitting the separation of the gums, tan sediments and like inert substances, and which also serve as a storage receptacle wherein the tan liquors may be collected, prior to their passage into the tank or cistern wherein they are to react with the proteids in solution or in suspension in the lime process effluent.

The final steps in the process characterizing the present invention, will now be readily understood. The effluent from the storage and sedimentation tank or cistern containing the waste tan liquors is discharged into the tank or cistern containing the effluent from the sedimentation tank of the lime process waste liquors. The discharge of the effluent from the two sedimentation tanks or cisterns into the reaction tank or cistern may be simultaneous, or, if preferred, may be successive. In either event, the proteids react with the waste tan liquor and are precipitated, in their substantial entirety in the bottom of the reaction tank or cistern. The precipitate constitutes the nitrogenous material characteristic of the invention, and the effluent from the reaction tank or cistern may be permitted to go to waste, or may be subsequently treated for the recovery of any of the values contained therein. Particularly, however, it is to be noted that this effluent contains no hydrated alkali and no free acid so that it can be discharged into the running streams without polluting the stream and without other disadvantages.

The precipitated proteids may then be removed from the reaction tank or cistern and are practically insoluble in water and are non-putrescible. They are capable of being converted into available fertilizer material for plant assimilation, by treatment with sulfuric acid, and may be dried, without loss, at temperatures so high as to entirely destroy any bacterial life therein. In fact, the precipitated proteids may be regarded as "tanned" by their reaction with the tan liquors, which have not only precipitated the proteids held in solution, but which have exerted upon them and upon the proteid particles held in suspension, the preservative effects due to the action of tanning liquors upon proteid substances under such conditions as prevail in the reaction tank or cistern.

In the accompanying drawing is shown a flow sheet indicating generally the steps of the process. In this drawing, A indicates the sedimentation tank or cistern wherein the undissolved lime salts, sand, silt, etc., are separated from the supernatant effluent. B indicates the tank or cistern for the storage and sedimentation of the waste liquors from the tanning process; and C indicates the reaction tank or cistern wherein the combined effluents from the tanks or cisterns A and B are received and wherein the proteids held in solution and in suspension are recovered as products available for use in the manufacture of fertilizers, ammonia, or for any other useful purpose.

Having thus described my invention, what I claim is:

1. The method of recovering, from the waste liquors of the lime process of the hide-treating art, material available for use in the manufacture of fertilizers and other useful products which consists in separating from said liquors an effluent containing proteids and precipitating and preserving against putrescence said proteids by subjecting them to the action of the waste liquors from the tanning process; substantially as described.

2. The method of recovering, from waste liquors of the lime process of the hide-treating art, material available for use in the manufacture of fertilizers and other useful products which consists in separating from said liquors an effluent containing proteids partly in solution and partly in suspension, and precipitating and preserving against putrescence said proteids by subjecting them to the action of the waste liquors from the tanning process; substantially as described.

3. The method of recovering, from waste liquors of the lime process of the hide-treating art, material available for use in the manufacture of fertilizers and other useful products, which consists in separating out from said liquors suspended lime salts, sand and the like, passing the residual effluent into a reaction receptacle and subjecting it therein to reaction with the solvent portion of the waste liquors of the tanning process, and recovering the resulting precipitate in a substantially water-insoluble and non-putrescent condition; substantially as described.

In testimony whereof I affix my signature.

CHARLES LEE PECK.